INVENTOR
DANIEL DUCLAUX

United States Patent Office 3,480,526
Patented Nov. 25, 1969

3,480,526
ELECTRODE GUIDE AND PLACEMENT MEANS AND METHOD
Daniel Duclaux, Lille, France, assignor to Pechiney-Compagnie de Produits Chimiques et Electrometallurgiques, Paris, France
Filed May 3, 1967, Ser. No. 635,852
Claims priority, application France, May 12, 1966, 61,256
Int. Cl. C22d 3/12, 3/02
U.S. Cl. 204—67                                                      10 Claims

ABSTRACT OF THE DISCLOSURE

This invention is addressed to a means and method for the proper positioning of replacement electrodes in an electrolysis cell wherein use is made of a key mounted for vertical translatory movement and means thereon for interengagement with the electrode and with a reference mark on the key adapted to relate to reference marks on the electrodes for proper orientation of the key with the electrode and in which the means for vertical adjustment of the key and electrode are mounted in spaced relationship from the key and include a stationary rule having graduations thereon and another rule mounted for movement relative to the stationary rule with an indicator means releasably engaging the mobile and stationary rules for indicating the amount of relative movement between the mobile and stationary rules for proper adjustment of the key and electrode and means interconnecting the mobile rule with the key for translation of movements of the mobile rule to the key to effect adjustments.

---

This invention relates to a method and means for the regulation of the height or position of a vertically disposed elongate electrode or electrodes.

A large number of devices, especially vats or cells used in electrolysis, make use of electrodes which are consumed as the electrolytic process proceeds and which require replacement when consumed. The replacing electrode should be so placed that its lower end corresponds exactly to the position of the lower end of the electrode replaced.

The electrodes are usually carried by a support which is movable relative to a stationary frame to permit lowering of the electrodes into the bath or vat as they are consumed so as to maintain a desirable relationship with the cathode.

As used herein, the term "electrode" is meant to refer to the entire set of electrodes being consumed, plus the suspension device, when used, to connect the electrode with the support.

The following principles apply to known methods for adjustment of the electrodes to the desired height in the cell. The electrodes and their suspension rods or other suspension means are usually provided with a reference mark impressed at a predetermined level above the lower end. The new electrode is placed so that its reference mark is at a higher level than a reference mark located at a known constant level to the bottom or with respect to the reference electrode with the difference in level corresponding to the attrition of the reference electrode after being correctly installed in position. In practice, the operator climbs on the vat and manually measures the reference side electrode with respect to the stationary frame. He then places the new electrode with its reference mark spaced vertically above the reference mark of the reference electrode by the amount of wear and tear of the reference electrode. All of this measuring and positioning is done while the operator is on top of the vat.

While the described procedure is simple, it often fails to take into consideration that, during the life of the support, a certain amount of deformation occurs. Such deformations are especially large in heated vats used for the production of aluminum by electrolysis since, for the most part, the electrode support forms one piece with the vat frame which becomes seriously deformed as it ages. In addition, the frame rarely remains horizontal. Still further, the operation is delicate and dangerous because the operator is required to work on a hot vat with the possibility that his foot might slip into the vat and, therefore, must be very careful and cognizant of what he is doing.

It is an object of this invention to provide a new and improved method and means for regulating the position of vertically disposed electrodes to mount the electrode at a proper height without the need for consideration of any warpage or deformation of the support; in which the desired mounting relationship can be established without the need to climb or work on the hot vat or cell; and in which the mounted relationship can be effected by means of operations and control remote from the electrode.

These and other objects and advantages of this invention will hereinafter appear and for puropses of illustration, but not of limitation, embodiments of the invention are shown in the accompanying drawing, in which—

Figures 1, 2, 3, 4:
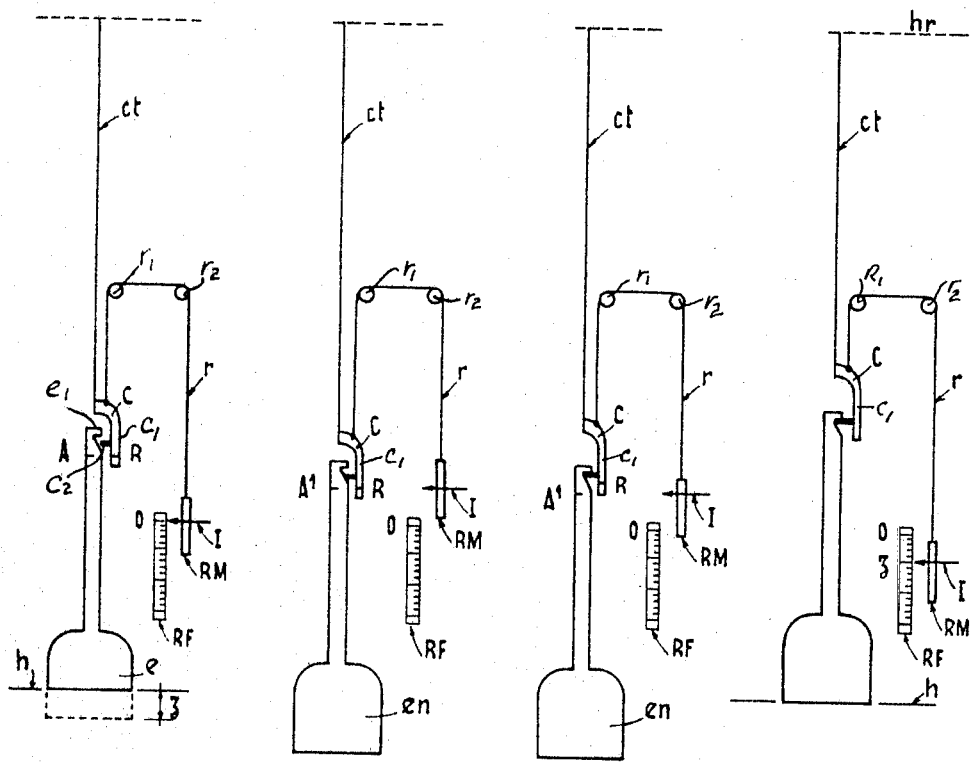
FIG. 1 is a schematic elevational view of the arrangement of elements in a first step of the process.
FIG. 2 is a view similar to that of FIG. 1 showing a second stage of the process.
FIG. 3 is a view similar to those of FIGS. 1 and 2 showing a still further stage in the process.
FIG. 4 is a view similar to those of FIGS. 1–3 showing the arrangement of elements during the final stages of adjustment.

Briefly described, the device of this invention comprises a key C mounted for vertical movement and including a horizontally disposed upper portion and a portion $C_1$ depending vertically from said horizontally disposed portion with an abutment $C_2$ or shelf extending horizontally laterally from the lower end portion thereof and with a reference mark R impressed in the lower portion of the key, preferably below the abutment $C_2$. Each electrode $e$ is also provided at its upper end portion with a reference mark A at a predetermined constant level above the lower end and the electrode rod is usually provided with an overhang $e_1$ in position to be engaged by the abutment $C_2$.

Unconnected to the electrode or its support is a fixed, stationary, vertically disposed rule RF divided into vertically spaced apart graduations and another rule RM is mounted adjacent to the stationary rule for vertical translatory movement relative thereto. A cable $r$, trained over rollers or sheaves $r_1$ and $r_2$, is connected at one end to the movable rule RM and at the other end to the key for translating vertical movement of one to the other but in opposite directions. A pointer I is mounted for movement vertically relative to the rules RM and RF and it is provided with means for locking the pointer to fix its position either on the rule RM or RF or both, as the case may be.

In operation, the key C is placed on an electrode $e$ which is designated as a reference electrode. The reference marks A and R are aligned crosswise and the pointer I is adjusted for crosswise alignment with the zero position on the stationary rule and then the pointer is locked in this position on the mobile rule RM. Next the key C is removed from the reference electrode and placed onto the new electrode with the reference mark of the new electrode identified in the drawing as A' and with the reference mark R of the key crosswise aligned with the mark A' of the new electrode. The pointer I is then unlocked from the mobile rule and locked in place on the stationary rule. The key is then attached to the new electrode *en* and the pointer I is unlocked from the stationary rule RF and locked onto the mobile rule. The pointer is then moved downwardly along the stationary rule to the predetermined marking corresponding to the attrition of the reference electrode thereby to position the new electrode at the desired level of adjustment.

In accordance with one modification of the invention, the reference electrode can be the electrode to be replaced by the new electrode whereby its wear or attrition can be directly measured from its reference mark A.

In accordance with another modification, applicable particularly to apparatus having a plurality of electrodes, the reference electrode can be a single electrode selected from the group and the amount of wear is calculated or considered as an average of the wear of all of the electrodes.

There are a number of thermal or electrolytic apparatuses which make use of consumable vertically disposed electrodes of the type described in which vertical translatory movement is required to compensate for the consumption of the electrode during use. When the electrode has been lowered to the fullest extent possible, it becomes necessary to replace the electrode with a new electrode but with vertical adjustment to position the lower edge of the new electrode at the same level as that of the electrode which it replaces.

Illustration can be made with reference to a heated vat for the production of aluminum by electrolysis. For this purpose, use is made of prebaked anodes formed of one or more blocks of carbon joined by a rod for mechanical support and in which the rod also functions as a conductor for the electrical current. The anodes are suspended by the rods from a bus bar which may be mounted for vertical movement relative to the cathode of the cell. As the anodes are consumed, the supporting bar is lowered by an amount to maintain a relatively constant spaced relationship between the anode plane formed by the lower ends of the anodes and the cathode.

When an anode is used to its fullest extent, replacement is required while still maintaining the anode plane. In order to accomplish the desired positioning, all of the anode rods are provided with a reference mark A at a predetermined height with reference to the lower end of the electrode. One of the anodes of the group is usually selected as a reference anode and its wear is evaluated statistically or otherwise as representative of the average attrition of the group of anodes making up the assembly.

In replacement of an anode, the new anode is positioned with its reference mark A' at a higher level than the reference mark A of the reference electrode, the difference being equal to the amount of attrition of the reference anode so that its lower end will be at the same level as the reference anode.

This mode of procedure is somewhat akin to the placement of the new electrode with respect to a reference mark provided on a stationary beam. However, such beam rarely remains horizontal, especially when it is mounted on the frame of the vat and subjected to change in height due to the large stresses and strains to which the frame or superstructure are subjected during use. This technique is also objectionable in that it requires the operator to work on top of the vat under very disagreeable and dangerous conditions since a portion of the molten bath is exposed while changing an anode. In addition, human error is ever present to introduce further problems with respect to the proper location of the anode. On the other hand, the means of this invention are simple in construction and in operation, yet function in a manner which avoids the objections and inaccuracies of the methods and means heretofore employed in that it operates accurately to locate the new electrode without connection to the vat or frame and while the operator can be stationed at a distance from the cell. The device and method of this invention has application also to arc or resistance furnaces as well as to electrolysis vats.

With reference now to the drawing, illustration is made of an electrolysis vat having electrodes, the lower ends of which are aligned in a horizontal plane $h$. The electrodes are illustrated as being suspended by rods but the invention can be practiced with electrodes that are directly suspended or which embody other means for attachment.

For guiding the electrodes in vertical movement, use is made of the key C, shown schematically in the drawing as having an automatic interlock with the electrode by means of a ratchet or spring $C_2$ secured to an intermediate portion of a depending arm $C_1$ but in which use can be made of other means for interengagement, such as a clamp. The key C is guided in vertical movement by means of an elongate tube or cable *ct* controlled by means of a jack, chain or cable for vertical translatory movement.

The upper ends of the electrodes are formed with a reference mark in close vicinity to the portion to be attached or connected with the key, with the reference mark in the positioned electrodes *e* being designated by the letter A and with the reference mark in the new electrodes being designation by the letter A'.

A rule RF is mounted on the apparatus which operates to guide the key C and which is preferably arranged separate and apart from the vat or its superstructure. The rule RF, which is fixed in position, is subdivided by markings in vertically spaced apart relation.

Another rule RM is mounted for vertical movement adjacent to and relative to the stationary rule RF and it too is subdivided into ruled sections. The upper end of the movable rule RM is connected to one end of a cable *r* while the other end of the cable is connected to the key C with intermediate portions of the cable being trained over guide rollers or sheaves $r_1$–$r_2$ for translating vertical movement of the key to vertical movement of the rule RM, or vice versa, but in opposite directions.

The pointer I is provided with means for attachment to either the mobile rule RM or the fixed rule RF or to both or to neither, as the case may be.

In practice, to effect replacement of a used electrode *e* with a new electrode *en*, the key C is first positioned on an electrode *e*, hereinafter identified as the reference electrode, but without attachment thereto. The reference mark R on the key C is crosswise aligned with the reference mark A of the reference electrode. The indicator I is moved into crosswise alignment with the zero position of the fixed rule RF and it is then locked in place on the mobile rule RM, as illustrated in FIG. 1.

With reference now to FIG. 2, the key C is positioned on the new electrode *en*. The reference mark R of the key is brought into crosswise alignment with the reference mark A' of the new electrode. The pointer I is then locked onto the stationary rule RF and disengaged from the mobile rule RM.

With reference now to FIG. 3, the key C is raised until its engagement means $C_2$ comes into tensioned engagement with the hook $e_1$ in the upper end portion of the electrode *en* for interconnection therewith. The relative positions between the key and the electrode will change so that the two reference marks A' and R will no longer be crosswise aligned but, instead, the reference mark R will usually be at a higher level than the reference mark A'. To correct for the offset, the pointer I is locked onto the mobile rule RM and unlocked from the stationary rule RF.

Finally, as shown in FIG. 4, the new electrode is placed in the vat and its vertical position is adjusted by moving the pointer I downwardly along the stationary rule while being locked to the mobile rule until the pointer is in crosswise alignment with the graduation on the fixed rule which corresponds to the wear or attrition $z$ calculated for the reference electrode *e*.

If the reference electrode $e$ is the used electrode that is removed for replacement, the length of the attribution $z$ can be measured directly on the electrode from the reference mark A. Instead, the length can be calculated as an average for the wear and tear of the electrode of the same group. In such event, the first steps represented by FIG. 1 would be carried out before the reference electrode is removed. When the electrodes are large in number, it is expedient to designate one electrode as a reference electrode, the attrition $z$ being calculated as an average of the attritions of a former complete set of electrode of the same cell.

Where the device of this invention is utilized in an operation having such associated apparatus as a rolling bridge or crane for servicing the various cells, the rules and pointer can advantageously be located in the cab so that the operator can place the electrodes without the need for outside assistance. In the drawing, the rolling bridge will constitute the reference horizontal $hr$.

The procedure of this invention enables deformation of the layer of cathode metal readily to be taken into account, such as the tendency for the cathode metal to buckle under the electromagnetic forces to become dome-shaped. In order to achieve correct distribution of current between the anodes, it is desirable for all of the anodes of the cell to be adjusted to the same interpolar distance. Once the deformation of the cathodic metal is determined, the level differences between the bottom of the reference anode and the new anode can be determined to enable corresponding correction of the attrition to the reference electrode in determining the level at which the reference mark $A'$ should be placed on the new electrodes.

Figure 5:
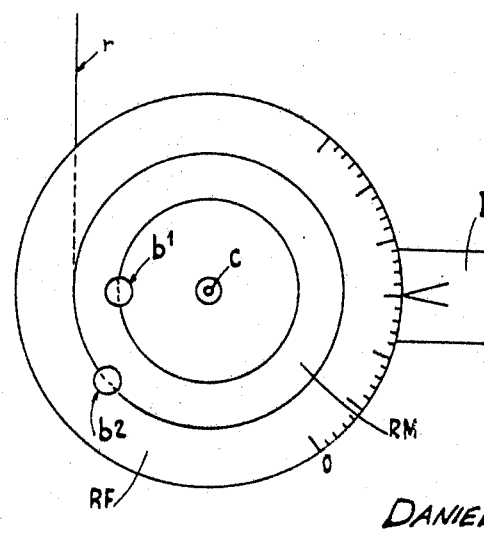
FIG. 5 is an elevational view of a modification in the elements and their arrangements used in carrying out the process of this invention.

Instead of making use of rules RF and RM of rectilinear shape, use can be made of rules of circular or disc shape, as shown in FIG. 5, in which the disc-shaped rules are mounted for turning movement about a common center C. The mobile pointer I is embodied as a radially extending arm having a length greater than the radius of the largest of the disc members so as to extend beyond the periphery thereof and the arm is mounted for rotational movement about the same center. The pointer can be locked to the mobile disc RM by means of a button $b^1$ or to the fixed disc RF by the button $b^2$. A drum is secured to the disc RM for rotational movement therewith about the same axis and the cable $r$ is adapted to wind or unwind from the drum in response to turning movement of the disc RM. Thus the rectilinear movements of the rule RM in FIGS. 1–4 is transposed to rotational movement of the disc RM of FIG. 5, otherwise the operations are substantially the same.

By way of a further example, use can be made of the concepts of this invention in the production of aluminum in an electrolytic cell which makes use of a continuous Soederberg anode having vertical gudgeon bolts. These bolts move downwardly with the anode in proportion to the consumption of the carbonaceous material of which the anodes are formed. When the bolts arrive at a predetermined distance from the bottom of the anode, the bolts are withdrawn for re-insertion at a higher level to support the anode. A reference mark $A'$ for the replacement is located at a higher level than the reference mark A of the gudgeon bolt selected as the reference. The difference between A and $A'$ corresponds to the attrition of the anode since the reference bolt was originally placed in position in the anode.

It will be apparent from the foregoing that there is provided a simple, efficient, safe and reliable means for replacement of anodes in electrolytic cells whereby the lower ends of the anodes are maintained in the desirable plane.

It will be understood that changes may be made in the details of construction, arrangement and operation without departing from the spirit of the invention, especially as defined in the following claims.

I claim:

1. A device for regulating the level of replacements for vertically disposed electrodes, each of which has a reference mark in an upper portion thereof at a uniform height with respect to the lower end, a key having a reference mark in a portion thereof, means for interengagement between the key and electrode for guiding the electrode in vertical translatory movement, a stationary rule separate and apart from the electrode, another rule adjacent the stationary rule and means mounting the other rule for movement relative to the stationary rule, a pointer and means releasably securing the pointer to the stationary and mobile rules, and means interconnecting the mobile rule with the key for translating movement of one to the other.

2. A device as claimed in claim 1 in which the stationary rule and the mobile rule are vertically disposed elongate members with the mobile rule mounted for vertical movement relative to the stationary rule.

3. A device as claimed in claim 2 in which the means interconnecting the mobile rule with the key operates to translate vertical movement of the mobile rule in one direction to vertical movement of the key in the opposite direction and vice versa.

4. A device as claimed in claim 2 in which the means interconnecting the mobile rule and the key comprises an elongate cable.

5. A device as claimed in claim 2 in which the mobile rule and stationary rule are formed with vertical graduations.

6. A device as claimed in claim 1 in which the stationary rule and the mobile rule are flat disc members having a common axis about which the mobile rule can be rotated.

7. A device as claimed in claim 6 in which the mobile disc rule includes a winding drum mounted for turning movement with the mobile rule and in which the means interconnecting the mobile rule and key comprises an elongate cable which winds about the drum at one end portion and is connected to the key at the other end portion.

8. The method for replacement of an electrode in an electrolytic cell by the use of a device as claimed in claim 1, the steps of aligning the key crosswise with the reference electrode, unlatching the pointer from the stationary and mobile rules and adjusting the pointer vertically into crosswise alignment with a zero position on the stationary rule and latching the pointer in position on the mobile rule, aligning the key crosswise with a reference mark on the new electrode, and latching the pointer from the mobile rule and securing it to the stationary rule, connecting the key to the new electrode, unlatching the key from the stationary rule and latching it onto the mobile rule and moving the key while latching onto the mobile rule into crosswise alignment with a scale marking on the stationary rule corresponding to the amount of attrition of the reference electrode.

9. The method as claimed in claim 8 in which the reference electrode is the electrode to be replaced by the new electrode whereby the amount of attrition can be measured directly on the reference electrode.

10. The method as claimed in claim 8 in which the reference electrode is one of a plurality of electrodes making up the electrolytic cell.

References Cited

FOREIGN PATENTS 1,047,182   12/1953   France.

JOHN H. MACK, Primary Examiner

D. R. VALENTINE, Assistant Examiner

U.S. Cl. X.R.

204—225, 243, 297